US007155430B2

(12) United States Patent
Sihvo et al.

(10) Patent No.: US 7,155,430 B2
(45) Date of Patent: Dec. 26, 2006

(54) METHOD FOR PROVIDING DATA INQUIRY SERVICE AND DATA INQUIRY SERVICE SYSTEM

(75) Inventors: Jyri Sihvo, Kirkkonummi (FI); Petri Ahonen, Joutseno (FI)

(73) Assignee: Fonecta Ltd., Helsinki (FI)

( * ) Notice: Subject to any disclaimer, the term of this patent is extended or adjusted under 35 U.S.C. 154(b) by 389 days.

(21) Appl. No.: 10/451,656

(22) PCT Filed: Dec. 13, 2001

(86) PCT No.: PCT/FI01/01090

§ 371 (c)(1),
(2), (4) Date: Aug. 22, 2003

(87) PCT Pub. No.: WO02/054283

PCT Pub. Date: Jul. 11, 2002

(65) Prior Publication Data

US 2004/0068508 A1    Apr. 8, 2004

(30) Foreign Application Priority Data

Dec. 28, 2000  (FI) ................................. 20002868

(51) Int. Cl.
*G06F 17/30* (2006.01)
*G06F 7/00* (2006.01)
(52) U.S. Cl. ................ 707/4; 707/2; 707/5; 707/3
(58) Field of Classification Search .............. 707/2, 707/4, 5, 3
See application file for complete search history.

(56) References Cited

U.S. PATENT DOCUMENTS 5,477,450 A * 12/1995 Takeda et al. ............ 704/2
5,943,643 A * 8/1999 Van De Veen ............ 704/2
5,974,372 A * 10/1999 Barnes et al. ............ 704/8
6,025,843 A    2/2000 Sklar
6,064,951 A * 5/2000 Park et al. ............ 704/8
6,151,702 A * 11/2000 Overturf et al. ......... 717/136

(Continued)

FOREIGN PATENT DOCUMENTS

WO    WO 97/15889    5/1997

OTHER PUBLICATIONS

William A. Woods: Conceptual Indexing, a better way to organize knowledge, Sun Microsystems Laboratories Technical Report Series, 1997, koko dokumentti.

(Continued)

*Primary Examiner*—Don Wong
*Assistant Examiner*—Thanh-Ha Dang
(74) *Attorney, Agent, or Firm*—Cohen, Pontani, Lieberman & Pavane (57) ABSTRACT

One unified virtual tree structure of categories is provided for different categorized directory resources having different category structures but at least partially similar contents. The unified category tree may be multilingual, .i.e., the tree structure and the unified category descriptions are available in all languages in which the inquiry service is offered to the service users. Further, mapping information is provided which maps the categories of the unified category tree to categories of the different directory resources. A centralized enquiry service system presents at least one category and the respective category description of the unified category structure relevant to an inquiry made by an end user. The user selected one of the unified categories, and the service system performs an inquiry to relevant categories in the target directory resource on the basis of the mapping information and presents resulting data records to the user under the selected unified category.

10 Claims, 4 Drawing Sheets

MAPPING EXAMPLE

| Tree Category | FIN Resource | GBR Resource |
|---|---|---|
| C28 | F12 | E14 |
| C36 | F11, F13, F14 | E2 |
| C32 | F2 | E6 |
| • | | |

U.S. PATENT DOCUMENTS

| | | | |
|---|---|---|---|
| 6,272,508 B1* | 8/2001 | Dyne et al. | 715/530 |
| 6,321,190 B1* | 11/2001 | Bernardes et al. | 704/8 |
| 6,523,021 B1* | 2/2003 | Monberg et al. | 707/2 |
| 6,623,529 B1* | 9/2003 | Lakritz | 715/536 |
| 2002/0002452 A1* | 1/2002 | Christy et al. | 704/3 |
| 2002/0123982 A1* | 9/2002 | Masuichi | 707/1 |
| 2002/0138469 A1* | 9/2002 | Horovitz et al. | 707/2 |
| 2002/0174150 A1* | 11/2002 | Dang et al. | 707/536 |
| 2002/0193983 A1* | 12/2002 | Tokieda et al. | 704/2 |
| 2002/0193986 A1* | 12/2002 | Schirris | 704/8 |

OTHER PUBLICATIONS

Chen, Lotz: A survey of context-aware mobile computing research, Dartmouth College Computer Science Technical Report TR2000-381, 16 pp, Nov. 2000.

* cited by examiner

Fig. 1A

FINNISH RESOURCE CATEGORIES:

Category Description
(F1) Ravintoloita
(F2) Pizzerioita
(F3) Autovuokraamoja
(F4) Autoliikkeitä
(F5) Autokorjaamoja
(F6) Huoltoasemia
(F7) Musiikkiliikkeitä
(F8) Soittimia
(F9) Supermarketteja
(F10) Hypermarketteja
(F11) Lähikauppoja
(F12) Elokuvateattereita
(F13) Elintarvikekioskeja
(F14) Kioskeja

BRITISH RESOURCE CATEGORIES:

Category Description
(E1) Supermarkets
(E2) Cornershops
(E3) Guitar shops
(E4) Chinese restaurants
(E5) Low-budget restaurants
(E6) Pizza & Italian
(E7) Car rental
(E8) Car dealer
(E9) Car repair
(E10) Gas station
(E11) Musicstores
(E12) Music instruments
(E14) Cinema
(E14) New car spare parts
(E16) Used car spare parts

MAPPING EXAMPLE
| Tree Category | FIN Resource | GBR Resource |
| --- | --- | --- |
| C28 | F12 | E14 |
| C36 | F11, F13, F14 | E2 |
| C32 | F2 | E6 |
| · | | |

Fig. 4

```
SEARCH WORDS FOR THE RIGHTWARD CATEGORIES
CATEGORY C21:

C1   Car & Automobile
+---C11 Repair & service
     +---C21  Car repair shop
     +---C22  Carmake specific services
     +---C23  Car wash

CATEGORY C23:

C1   Car & Automobile
+---C11 Repair & service
     +---C21  Car repair shop
     +---C22  Carmake specific services
     +---C23  Car wash
```

Fig. 5

- User chooses language — 51
- Choose resource for inquiries — 52
- Enter keywords — 53
- Solve tree categories matching keywords — 54
- Create subset of category tree — 55
- Display subset of tree, categories in user language — 56
- User chooses category — 57
- Solve resource specific categories from mapping — 58
- Use resource specific categories for inquiring records — 59
- Display records under tree category heading — 60

Fig. 6

METHOD FOR PROVIDING DATA INQUIRY SERVICE AND DATA INQUIRY SERVICE SYSTEM

PRIORITY CLAIM

This is a U.S. national stage of application No. PCT/FI01/01090, filed on 13 Dec. 2001. Priority is claimed on that application and on the following application(s): Country: Finland, Application No.: 20002868, Filed: 28 Dec. 2000.

FIELD OF THE INVENTION

The present invention relates to inquiries to categorized information databases, such as a Yellow Pages architecture.

BACKGROUND OF THE INVENTION

The Yellow Pages directory is a well-known business information bridge between buyers and sellers throughout the world. Traditionally the Yellow Pages directory has been a classified paper directory in which the sellers of services and products can have advertisements. Nowadays, the Yellow Pages directories are also available on the Internet so that the users can access the directories on-line with standard web browsers. Further, mobile users can make inquiries to the Yellow Pages directories if the mobile equipment supports a short message service or Internet access.

The Yellow Pages directory contains information about businesses categorized by headings. The categories are defined by type of product or service sold by the various businesses. The same basic information, called a record herein, such as a business name, address and phone number, is provided for each included business. Different Yellow Pages directories are published for different geographical regions (e.g. cities, counties, etc.). There are also various specialized Yellow Pages directories.

EP 0858635 discloses Yellow Pages catalogues or directories of distributed multimedia documents for the Internet. The user can navigate in a virtual reality space by looking up, looking down, turning around, zooming in, or zooming out. Category labels are displayed to the user in a tree structure hierarchy, and the user can make inquiries to the Yellow Pages.

U.S. Pat. No. 6,025,843 discloses an improved user interface for performing computer database searches and filtering search results. The data returned from the database query are displayed as tree structures.

Figure 1A:
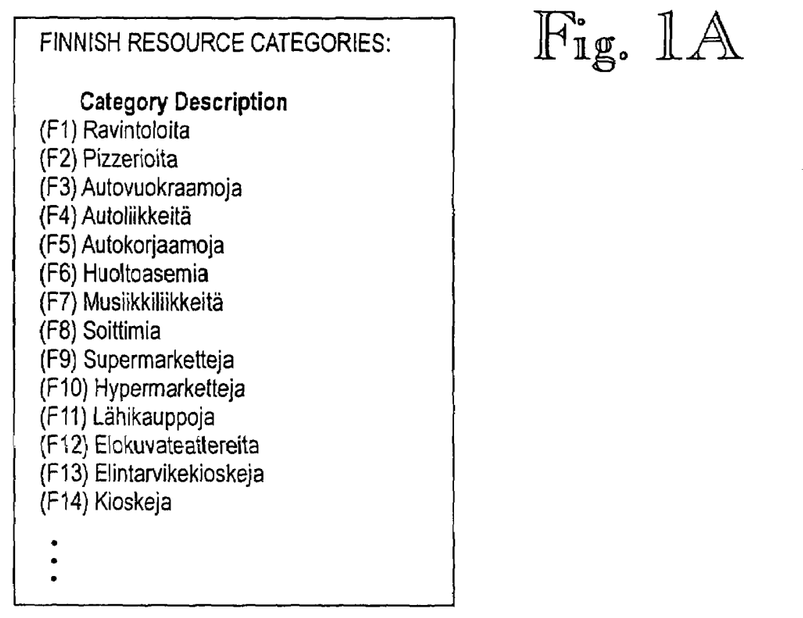
FIGS. 1A and 1B illustrate different directory resources.
Figure 1B:
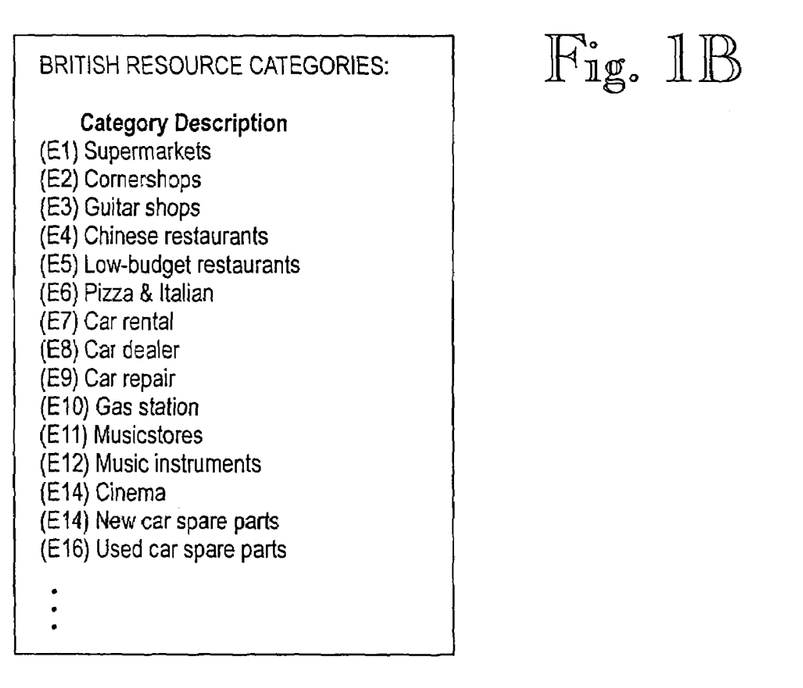

The Yellow Pages directories have different category descriptions and structure in different countries, or even within one country. An example of different category descriptions is shown in FIGS. 1A and 1B. In FIG. 1A, Finnish resource categories include categories F1 to F14 with corresponding category descriptions. The British resource categories include categories E1 to E16 with respective category descriptions. However, both the categories and the category descriptions differ from each other in the Finnish and the British directories. Further, the directories are in different languages. This makes it difficult to create inquiries to these directories. The inquiry must always define a directory-specific category in the language used in the directory resource to be accessed. If the inquirer decides to make the same inquiry to another directory, he/she has to redefine the category in the language used in the other directory. It is thus very difficult for the client to use the information directories available in different countries when he/she is travelling abroad. This disadvantage is particularly essential in mobile information services, since it discourages foreign mobile users from using the information services. Therefore, a need exists for an inquiry mechanism which makes the inquiries to different categorized directory resources easier.

SUMMARY OF THE INVENTION

An object of the invention is a method and a system for making inquiries to different categorized information directories.

This and other objects and advantages of the invention are achieved by means of a method and a system according to independent claims 1 and 6, respectively. Preferred embodiments of the invention are disclosed in the dependent claims.

According to the invention, one unified virtual tree structure of categories is provided for different categorized directory resources having different category structures but at least partially similar contents. In an embodiment of the invention, the unified category tree structure is multilingual, i.e. the unified category tree structure and unified category descriptions are available in all languages the inquiry service is provided for the service users. Further, mapping information is provided which maps the categories of the unified category tree structure to categories of the different directory resources. This modelling approach can be applied to any directories that have records with categories.

The invention provides a new approach to making inquiries to categorized directory resources. The end user, i.e. the service user, makes an inquiry to a centralized enquiry service system or server. The service system selects one or more of the directory resources as a target directory resource for each inquiry on the basis of the user's selection or another criterion. The service user also gives at least one search word which describes the categories in which he/she is interested. The service system presents the service user at least one relevant category and the corresponding category description of the unified category structure matching to said at least one search word and being mapped to the target directory resource. Categories that match in the search but that have not been mapped to the selected target directory resource are preferably omitted from the result presented to the service user. The service user selects one of said unified categories presented to him/her, and the service system determines which at least one category of the target directory resource is mapped to the selected unified category on the basis of the mapping information. The service system then performs an inquiry to the target directory resource using the at least one determined category as a constraint, and presents the data records resulting from said inquiry to the system user under the selected unified category.

In an embodiment of the invention, the selection of the target directory resource is location-dependent to enable location-dependent inquiry results to be provided. The location information may be a current location of the end user which is determined automatically by the service system or is indicated by the end user. The location information may be obtained from a positioning system of a mobile communications system. Alternatively, the end user may indicate the desired location where the required services, such as restaurants or shops, should locate. The location information given by said system user may include, for example, city, street address, area information, geographical coordinates, and/or country. The service system automatically filters off the directory resources and categories that do not match the inquiry in the respective location.

In the preferred embodiment of the invention, the user can select any language used in the multilingual unified category structure for an inquiry, independently of the directory resource in which the target resource resides. In other words, the user can use a different language than the directory resource. Further, all the directories provide the same structure and category descriptions in any language defined in the system. For example, a French user is shown only one category structure in French and uses it for inquiries to French, English and German directory resources. The Yellow Pages inquiries are thus similar and in the user's own language also in abroad. This makes the use of the Yellow Pages more attractive and comfortable also for foreigners.

BRIEF DESCRIPTION OF DRAWINGS

In the following, the invention will be described in greater detail by means of preferred embodiments and with reference to the accompanying drawings, in which.

PREFERRED EMBODIMENTS OF THE INVENTION

The present invention can be applied to any directories that have records with categories. In the following examples, the invention is illustrated by means of the "Yellow Pages" directories. The Yellow Pages directories have records of companies or services. Each of these records should belong to a category. These categories have different descriptions in different directory resources.

In the following, an example of the unified modelling of different directory resources according to the invention will be described.

Global, Multilingual Tree of Categories

First of all, a tree model of global categories is built. There are several tree instances of this global tree provided in different languages. The tree includes categories, providing the global structure that can be used to hide different structures of the different resources including the same type of contents. A creator of the tree must design the structure of the tree and choose names for the categories. These categories should be named with a general category name that can be represented/translated in several languages. A tree for at least one language must be built manually before the system can be used. For example, the English tree can act as a default tree for the structure. After the first tree has been built, the trees for other languages can be created.

Figure 2:
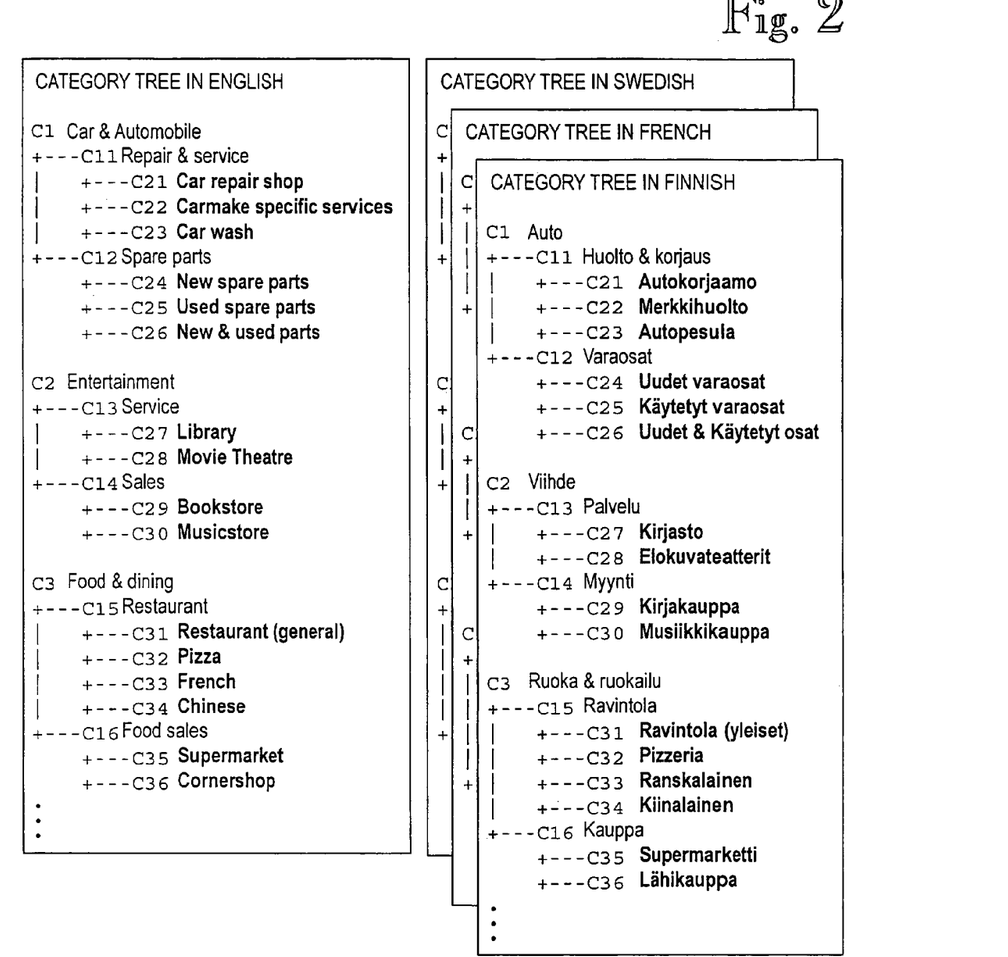
FIG. 2 is illustrates a global category tree in different languages.

In FIG. 2, an example of a global tree of categories is shown in the English, Swedish, French and Finnish languages. Similarly, any number of category trees in different languages can be created. The code Cxx refers to an identifier of the category. The level of the categories refers to the columns in the tree. For example, the rightmost category level in the trees includes categories C21, C22, C24, C25, etc. The leftward level highest in hierarchy includes categories C1, C2 and C3. The structure and the category identifiers must remain the same for the other trees, only the category name descriptions should be translated. The same structure of the trees enables any category from a tree to be presented in a desired language. For example, using the trees in FIG. 2, the category C27 can be presented in English as "Library" and "Kirjasto" in Finnish.

As shown in FIG. 2, the rightmost categories (printed in bold font) are the categories (i.e. the leaves of the tree) that represent the categories in the resources. The other category levels in the tree are more common terms for subcategories of the current term. For example, in FIG. 2, the category C16, "Food sales", is a common term for all subcategories of the category C16: C35 "Supermarket" and C36 "Cornershop". The function of these terms is to act as search words for the rightmost level categories. Uses of these search words will be described below.

Mapping Different Resources to Global Tree

Different resources have different category names, but most of the business categories are nearly the same around the world. For example, the category "Cinema" or the like probably exists almost in every Yellow Pages directory in the world. However, the name of the category can vary even in different resources in a single language.

Logically, when building a global tree, a category that represents different variations of the "Cinema" should be created into the category tree. In FIG. 2, the category is C28 and it is named as "Movie theatre" in the English tree. After that, categories that are logically similar in the directory resources should be mapped to this newly created global tree category.

Figure 3:
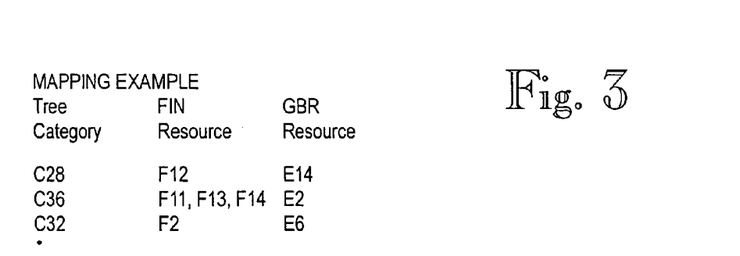
FIG. 3 shows an example of mapping between the global tree category and source directory categories.

Each category in a specific resource should be mapped to some category in the global category tree. The mapping can be carried out as a many-to-many relationship between resource categories and the rightmost level of the tree categories. This means that one category in the resource directory can be mapped to several categories in the global tree, and vice versa. The mapping can be carried out as one database table, such as the one illustrated in FIG. 3.

For example, as shown in FIG. 2, in the global tree there could be categories C24 "New spare parts", C25 "Used spare parts" and C26 "New & used spare parts". In a similar manner as shown in FIG. 1, the British resource may have categories E15 and E16 for "New spare parts" and for "Used spare parts", but no category for "New & used spare parts", for example. There are two possibilities to solve this. The first alternative is that the specific category in the global tree is not mapped to any category in the British resource directory. The second alternative is that both categories E15 and E16 in the British source directory are mapped to "New & used spare parts" category in the global tree. This method logically provides a category that includes companies that sell new and used spare parts.

It should be noted that the identifiers (IDs) shown before the category names in FIG. 2 are marked only to make the mapping easier to understand. It is possible that there are only category names in the resource directory and no identifiers. In such a case, the mapping data in the mapping database is between a tree category and a category name.

Utilizing Unified Model of the Categories in Inquiries

The hierarchical structure of categories used in the global tree provides an easier method for an end user to find a desired category. If there is only a list of the categories, a search can be carried out only as comparing strings, possibly using the wildcards. The tree structure may provide a set of search words for each mapped category. In this way, the user does not have to know the exact category description for the search. Instead, the user can submit search words, and the data enquiry service system can provide a set of categories matching those search words. Also, the set of the categories may be related to search words, and the end user can choose the category for the inquiry.

Figure 4:
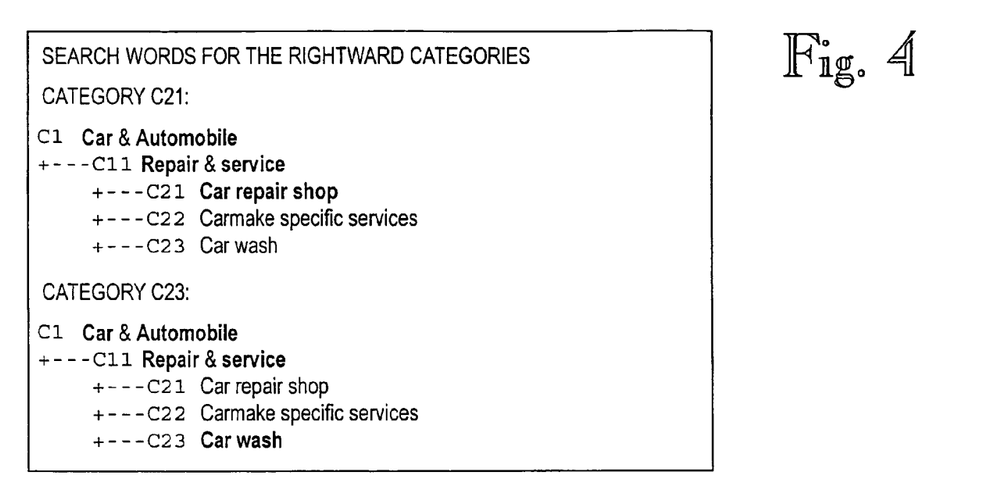
FIG. 4 shows an example of search words.

When the instance of the global tree is created, the inquiry service system automatically creates a set of search words for the rightward categories. The method is that for each of the rightmost categories, the words are collected from the category description from the current branch of the tree. In FIG. 4, a set of search words is shown for categories C21 and C23. The arch words are shown as bold text. Thus, the categories that have common parents will have common search words. For example, using the tree structure shown in FIG. 4, the category C21 has the search words "car, automobile, repair, service and shop" and the category C23 has "car, automobile, repair, service, wash".

The result for search words can be solved using the operator 'AND'. Thus, only categories having all given search words will be included in the result.

Flow of the Inquiry Using the Unified Modelling

Figure 5:
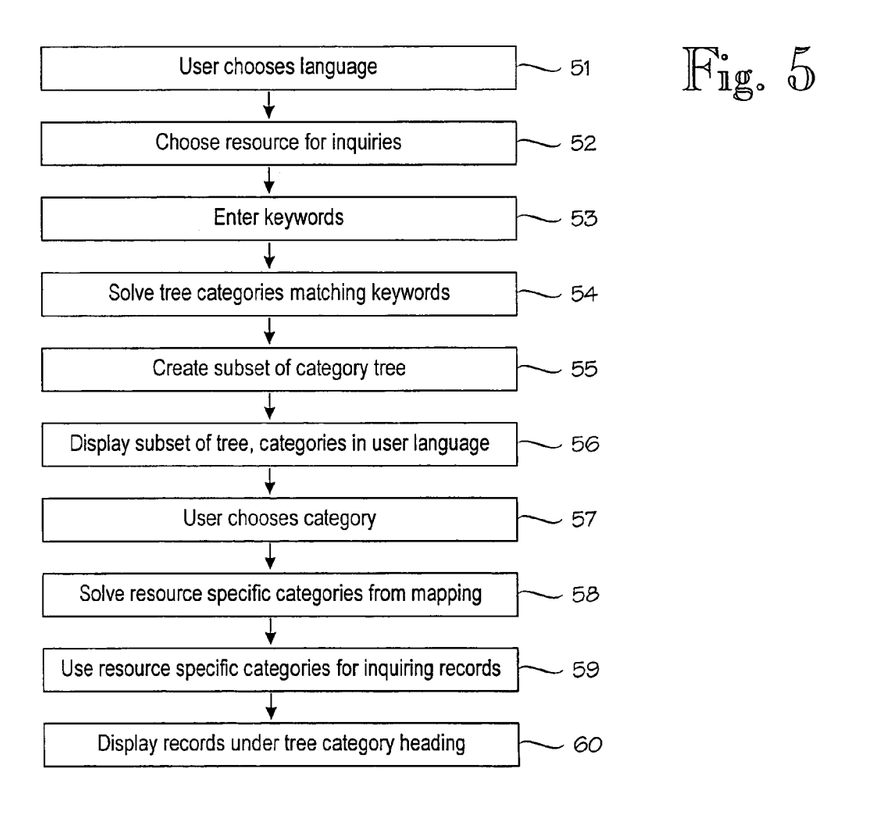
FIG. 5 is a flow diagram illustrating a basic inquiry process according to a preferred embodiment of the invention.

The flow of the inquiry is different for different user terminals, and possible different applications have variations of the inquiry flow. A basic flow that includes use of the mapping is shown in FIG. 5. Also, the application can have more constraints for the inquiry in order to get a smaller result set of the records. For example, the "city" can be used when inquiring Yellow Pages-type directories.

Referring to FIG. 5, the language is selected in step 51. For example, the end user himself/herself can choose the language, or the inquiry application run in the user terminal or in the service system selects a proper language for the user.

In step 52, a target directory resource is selected for the inquiries. The selection may be based on the user's own selection or another criterion, such as the location of the end user, or another location given by the end user.

In step 53, the end user submits search words for a desired category/categories in the selected language.

In step 54, then service system determines the categories of the global tree matching the given search words. However, the categories that match the search words but that have not been mapped to the selected target directory resource are not included in the result.

In step 55, the service system creates a subset of the global tree to be presented as a result, using the categories determined in step 54.

In step 56, the created subset of the global tree is displayed to the user, using the language selected in step 51.

In step 57, the end user chooses one of the displayed categories so as to inquire the corresponding records from the target directory resource.

In step 58, the service system, on the basis of the mapping information, determines the resource specific categories in the target resource that are mapped to the selected category of the global tree.

In step 59, the service system executes the inquiry to the target resource, using the categories determined in step 58 as a constraint.

In step 60, the records obtained from the target resource as a response to the inquiry are displayed to the end user under the selected category heading of the global tree.

Figure 6:
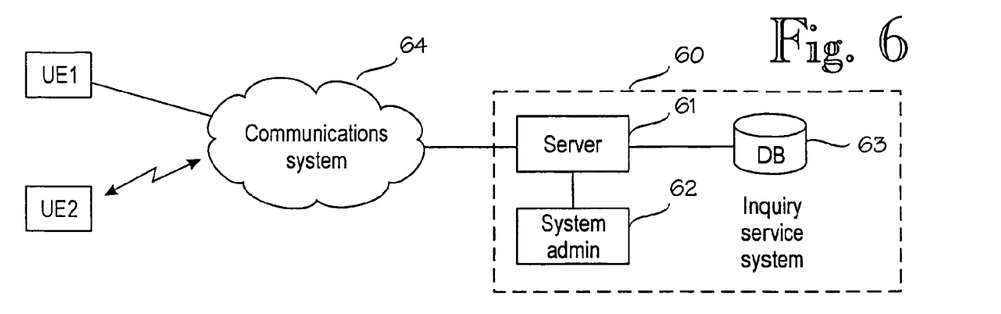
FIG. 6 illustrates an example of an architecture of the inquiry service system according to the invention.

FIG. 6 illustrates an example of an architecture of the inquiry service system according to the invention. The end users, such as wire-line user equipment UE1 and wireless user equipment UE2 communicate with an inquiry service system 60 via a communications system 64. The inquiry service system 60 comprises a server 61, a database 63 and a system administration unit 62. A database DB stores all information regarding the tree categories, keyword information, linking and mapping information. The main function of the database DB is to model Yellow Pages categories as a tree-like structure and to return the result back to the end user, who selects a particular category from the tree, depending on the type of inquiry. The tree structure also allows the end user to browse or navigate through the various categories in order to get the desired category in a particular format. The server 61 analyses an inquiry received from the end user UE1 or UE2 through the communications system 64. The server 61 also communicates with the database DB63 for obtaining the tree structure. The server 61 has a logic which supports different types of inquiries for different source directories. The source directories of different countries, for example, may be copied to the database DB so that the source directory inquiries can be made internally within the service system 60. However, typically at least part of the source directories are located at the specific country such that the server 61 makes inquiries to these distributed directories through the communications system 64. The administration unit 62 allows a service provider to modify and maintain the data in the database DB. For example, a new tree can be added for a new language, a new category can be added, a category/tree can be modified or removed, new mapping information can be entered, mapping information can be entered, keywords can be added or removed, etc.

Let us now examine the operation of the service system by means of three examples.

EXAMPLE 1

The end user makes an inquiry on the basis of a city and street address: [Uc001, UC002]. The server 61 obtains the site co-ordinates (x, y) with the help of the location information from an address-coordinate converter, which may be an external service. The server 61 limits the categories obtained from to those available within a circle (radius). A default radius exists for every country. These categories are then linked to the global tree, which is shown to the end user. The above process is described in detail here.

The categories obtained from the database DB are provided with a unique Identifier, which is linked to a category Ids in the hierarchically lowest level in the global tree (the rightmost categories in FIGS. 2 and 4, for example). The category Ids thus obtained from the database DB is used to retrieve the particular categories from the database DB. The categories are shown to the end user, depending on how many categories can be displayed in the user equipment UE of the end user.

The end user then selects a particular category. If, in the end user's system, only seven categories could be displayed and the number of categories to be displayed is more than seven, the categories are grouped under a common parent category and shown to the end user. If the end user selects a category other than a category in the lowest hierarchical level (the leaves of the tree), the server 61 gets the child categories (only the categories that were found in the area and not all the child categories) of the selected tree category. The above process continues till the end user selects a hierarchically lowest category. The server 61 maps the lowest category selected by the user to the source directory categories in the database DB. The server 61 then obtains the ItemIds with location (x, y) and category information as parameters. Using the ItemIds, the server 61 retrieves from the source directory (e.g. over the communications system 64) item information (records) in the form of a list, which is then shown to the end user. The end user can then either select a particular item to get more information or get the next items available. If the end user wants more information about an item, the server 61 gets more information from the target source directory and displays the same to the end user. On the other hand, if the end user wants more listing, the server 61, using the Item Ids, gets the Information from the source directory, and the process continues.

EXAMPLE 2

The end user makes an inquiry on the basis of a keyword and area information or street address. The server 61 uses the database DB to link the user-given keyword to a category in the tree, as will be described in more detail below.

There can be one or more keywords during inquiry. If there are more than one keyword with space between the keywords, the keywords are searched based on the 'OR' criteria. If the keywords are separated by the '+' sign, the two keywords are searched by the 'AND' criteria. For example: If the end user inquires with the keywords 'car bus', the search mechanism will be based on 'car or bus'. If the end user inquires with the keywords 'car+rentals', the keyword search will be based on 'car and rentals'.

The keyword given by the user is compared with the key words stored in the database DB. If a matching keyword is found, corresponding global tree categories are retrieved from the database DB. The categories relevant in that particular area are obtained by restricting these categories on the basis of the location (city or sublocality or street address) information given by the end user. These results are then linked to the global tree and the tree is shown to the end user, depending on how many categories can be displayed by the user equipment of the end user. Then the process proceeds as in example 1.

The description only illustrates the preferred embodiments of the invention. The invention is not, however, limited to these examples, but it may vary within the scope and spirit of the attached claims.

The Invention claimed is:

1. A method for providing a data inquiry service enabling service users to make inquiries to different categorized information directory resources over a communications system, said method comprising
   providing a unified category structure and unified category descriptions,
   mapping said unified category structure to categories of said different directory resources,
   selecting, in response to an inquiry initiated by a system user, at least one of said directory resources as a target directory on the basis of the user's selection or another criterion,
   presenting to the service user, in response to at least one search word given by the service user, at least one relevant category and the respective category description of the unified category structure matching said at least one search word and being mapped to said target directory resource,
   the system user selecting one of said unified categories,
   determining, in response to the system user selecting one of said unified categories and on the basis of said mapping, which at least one category of said target directory resource is mapped to said selected unified category,
   performing an inquiry to said target directory resource using said at least one determined category as a constraint,
   presenting data records resulting from said inquiry to the system user under said selected unified category.

2. The method according to claim 1, comprising
   providing a unified category structure and unified category descriptions in all languages in which the inquiry service is provided to the service users,
   selecting the language of said unified category structure for each inquiry on the basis of the user's selection or another criterion,
   presenting said unified category structure and said unified category descriptions to the system user in said selected language.

3. The method according to claim 1, comprising selecting said target directory resource on the basis of location information on said system user.

4. The method according to claim 3, comprising obtaining said location information from a user positioning system associated with a mobile communications system.

5. The method according to claim 1, comprising selecting said target directory resource on the basis of one or more items of the following location information given by said system user: city, street address, area information, geographical coordinates, and country.

6. A data inquiry service system comprising
   a communications interface for communicating with terminal equipment of service users over a communications system,
   means for making inquiries to different categorized information directory resources,
   a database storing a unified category structure and unified category descriptions, and mapping information mapping said unified category structure to categories of said different directory resources,
   means for selecting, in response to an inquiry initiated by a system user, at least one of said directory resources as a target directory on the basis of the user's selection or another criterion,
   means for presenting to a service user, in response to at least one search word given by the service user, at least one relevant category and the respective category description of the unified category structure matching said at least one search word and being mapped to said target directory resource,
   means for determining, in response to the system user selecting one of said unified categories and on the basis of said mapping information which at least one category of said target directory resource is mapped to said selected unified category,
   means for performing an inquiry to said target directory resource using said at least one determined category as a constraint,
   means for presenting data records resulting from said inquiry to the system user under said selected unified category.

7. The data inquiry service system according to claim 6, wherein said database is arranged to store said unified category structure and unified category descriptions in all languages in which the inquiry service is offered to the service users, and that said system is arranged to select the language of said unified category structure for each inquiry on the basis of the user's selection or another criterion, and to present said unified category structure and said unified category descriptions to the system user in said selected language.

8. The data inquiry service system according to claim 6, wherein said data inquiry service system is arranged to select said target directory resource on the basis of location information on said system user.

9. The data inquiry service system according to claim 8, wherein said data inquiry service system is arranged to obtain said location information from a user positioning system associated with a mobile communications system.

10. The data inquiry service system according to claim 6, wherein said data inquiry service system is arranged to select said target directory resource on the basis of one or more items of the following location information given by said system user: city, street address, area information, geographical coordinates, and country.

* * * * *